(12) United States Patent
Thakare et al.

(10) Patent No.: US 12,487,810 B2
(45) Date of Patent: Dec. 2, 2025

(54) MECHANISMS FOR SELECTING NODE UPGRADE ORDER

(71) Applicant: Salesforce, Inc., San Francisco, CA (US)

(72) Inventors: Shrikant Thakare, Burlington, MA (US); Maxence Weyrich, San Francisco, CA (US); Hemanth Siddulugari, Dublin, CA (US); Julian Chow, San Francisco, CA (US); Shivakarthik Subramanyam, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 97 days.

(21) Appl. No.: 18/055,624

(22) Filed: Nov. 15, 2022

(65) Prior Publication Data

US 2024/0160428 A1 May 16, 2024

(51) Int. Cl.
*G06F 8/65* (2018.01)
*G06F 9/48* (2006.01)

(52) U.S. Cl.
CPC .............. *G06F 8/65* (2013.01); *G06F 9/4881* (2013.01)

(58) Field of Classification Search
CPC . G06F 8/65; G06F 9/4881; G06F 8/70; G06F 8/60
USPC ........................................................ 717/168
See application file for complete search history.

(56) References Cited

U.S. PATENT DOCUMENTS

| | | | |
|---|---|---|---|
| 7,055,149 B2 | 5/2006 | Birkholz et al. | |
| 9,575,738 B1* | 2/2017 | Chopra | G06F 8/60 |
| 11,204,758 B1* | 12/2021 | Vattikuti | G06F 11/3006 |
| 2005/0267951 A1 | 12/2005 | Joshi et al. | |
| 2006/0218545 A1 | 9/2006 | Taguchi | |
| 2018/0067754 A1* | 3/2018 | Riscutia | H04L 51/046 |
| 2020/0177444 A1* | 6/2020 | Nelson-Gal | H04L 41/0866 |
| 2022/0300387 A1* | 9/2022 | Rayaraddi | G06F 11/2025 |
| 2023/0088858 A1* | 3/2023 | Tu | G06F 8/65 |
| 2023/0305877 A1* | 9/2023 | Gu | G06F 8/65 |

* cited by examiner

*Primary Examiner* — Bradley A Teets
*Assistant Examiner* — Zengpu We
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to upgrading nodes. A computer system may detect that an updated node image has been created that is an update to a previous node image used to deploy a plurality of nodes into an environment associated with the computer system. The computer system may determine an upgrade order in which to upgrade a set of the plurality of nodes. The upgrade order may be determined based on a rank associated with a given node of the set of nodes by a ranking service. The computer system may then upgrade the set of nodes according to the upgrade order. The upgrading of a first node of the set of nodes may include deploying a second node based on the updated node image and then evicting a set of application pods from the first node and redeploying the set of application pods onto the second node.

18 Claims, 12 Drawing Sheets

MECHANISMS FOR SELECTING NODE UPGRADE ORDER

BACKGROUND

Technical Field

This disclosure relates generally to computer systems and, more specifically, to various mechanisms for upgrading computing nodes.

Description of the Related Art

Cloud infrastructure typically includes hardware and software computing resources via which applications can execute that communicate with end users. For example, an application may execute in a virtual environment hosted on server-based hardware included in a datacenter of a cloud provider. Updates to the cloud infrastructure or the software deployed by tenants to that cloud infrastructure are often developed over time. As an example, a new virtual machine (VM) image that can be used to instantiate a VM onto the cloud infrastructure might be created by a VM developer. In many cases, multiple software resources (e.g., VMs) utilize the same version of software (e.g., the same server image) and thus an update to the software can involve updating more than one software resource. Moreover, the software resources may be expected to continue to interact with end users and other entities even when an upgrade to those software resources is planned.

DETAILED DESCRIPTION

Figure 1:
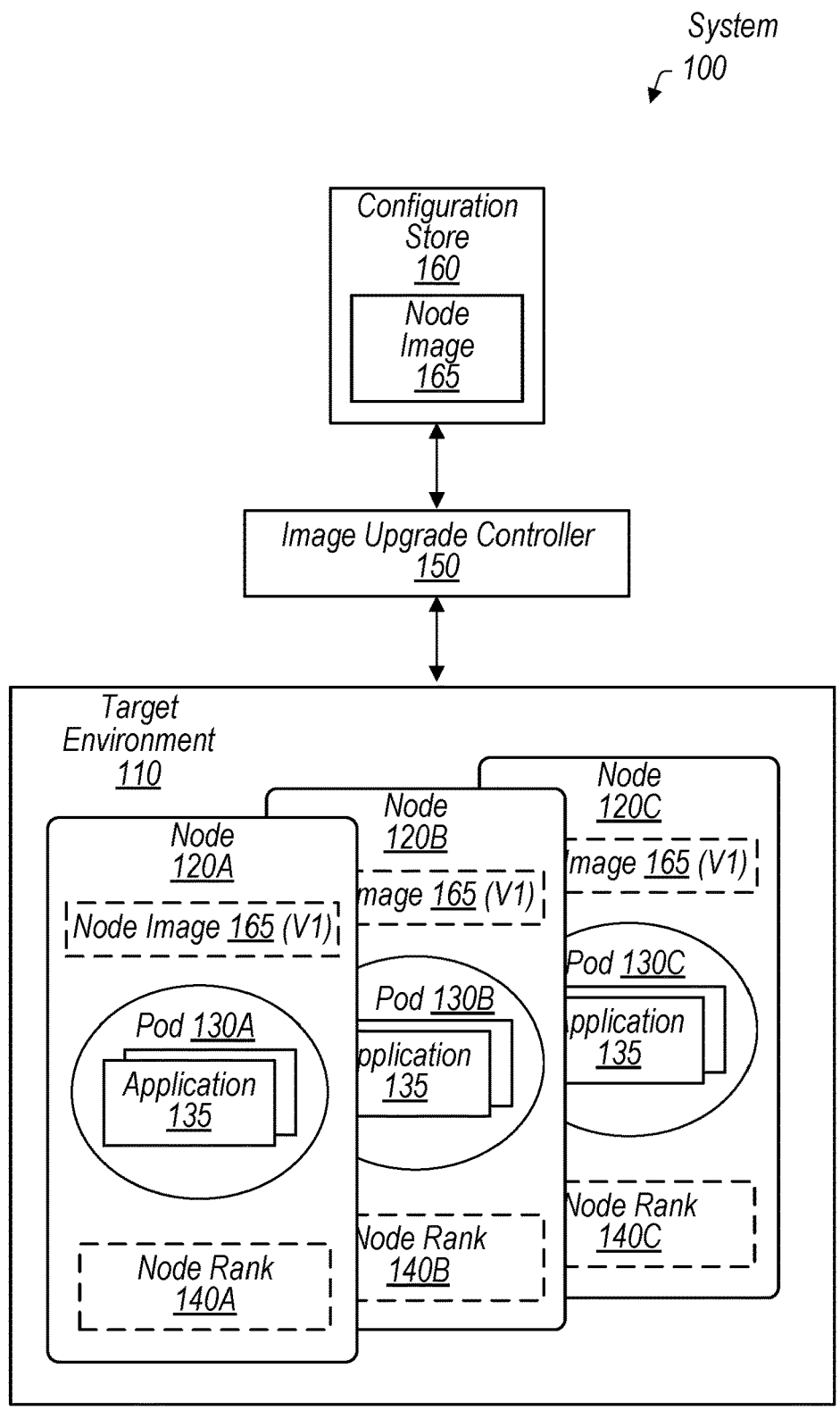
FIG. 1 is a block diagram illustrating example elements of a system that includes a node image upgrade controller capable of upgrading nodes, according to some embodiments.

In many cases, companies are now shifting from deploying their applications on a local infrastructure to deploying them on a cloud infrastructure that is provided by a cloud provider, such as Amazon™. Nodes (e.g., VMs), storage volumes, and other cloud resources are usually provisioned to enable the deployment and execution of applications. A node can be provisioned on the cloud infrastructure using a node image that includes all the information that is required to launch the node. When an update is released for a node image that was used to deploy nodes, it is often desirable to upgrade those nodes using the updated node image as the updated version can include fixes to vulnerabilities and software bugs. As discussed throughout this disclosure, in various embodiments, an image upgrade controller implements an upgrade process in which a new node is spun up with the updated node image and the application(s) executing on the old node are redeployed onto the new node.

A service distributed across multiple nodes, however, may implement a leader-follower approach in which an elected leader application is tasked with orchestrating the workflows and dataflows among the applications that implement that service. For example, a database server can be elected to be a leader (a primary server) that processes read and write transactions for a database while other database servers of a database system serve as followers (standby servers) that observe the work performed by the leader and process read transactions. When a leader becomes unavailable (e.g., taken down, crashes, etc.), a leader election is conducted among the remaining applications of the group to elect a new leader. This process can take a considerable amount of time and thus it may be desirable to avoid too many leader elections. If the upgrade controller is not selective as to the order in which it upgrades a group of nodes, it might trigger an undesirable number of leader elections. For example, the upgrade controller could initially upgrade a node having a leader, causing a leader election to select a leader from the other nodes. The next node that is upgraded by the controller may be the node with the newly elected leader, causing another leader election. Thus, in some cases, the upgrade controller may trigger a leader election for each node that it upgrades to the new node image. This disclosure addresses, among other things, the problem of how to reduce or otherwise avoid problematic paradigms that result from an incorrect upgrade order (e.g., too many leader elections) when upgrading a group of nodes.

In various embodiments that are described below, a computer system executes an image upgrade controller that manages a set of nodes deployed to an environment using a node image. During its operation, the image upgrade controller may detect that an updated node image has been created that is an update to the previous node image used in deploying the set of nodes to the environment. In response to detecting the updated image, the image upgrade controller may perform a node image upgrade process for the set of nodes. In various embodiments, the image upgrade controller determines an upgrade order for the set of nodes based on a rank associated with each node. The rank associated with a node may be determined based on ranks assigned by a ranking service to the pods or individual applications executing on that node—the ranking service is a separate component from the image upgrade controller, in various cases. As used herein, the term "pod" is used in accordance with its well-understood meaning and refers to a deployable unit comprising a group of one or more containerized applications that share a set of resources (e.g., shared storage). For example, a pod can include a database container (having a database server) and a set of containers having applications that collect telemetry. In various embodiments, the rank assigned to a pod by the ranking service corresponds to an importance of the application(s) in the pod that is determined by a user (e.g., an administrator, a developer, etc.) associated with that pod. For example, a user might cause a pod having a primary database server to be assigned a higher rank than a pod having a standby database server and thus a node having the former pod may be assigned a higher rank than the node having the latter pod. Once an upgrade order has been determined, the image upgrade controller upgrades the set of nodes according to the upgrade order. To upgrade a node, in various embodiments, the image upgrade controller deploys a new node based on the updated node image and then evicts the set of pods executing on the old node and redeploys them onto the new node.

These techniques may be advantageous as they allow for a set of nodes to be upgraded in accordance with an upgrade order that can be defined by a user (e.g., a developer) associated with a service that is executing on the nodes and thus problematic paradigms resulting from an incorrect upgrade order can be avoid. As an example, in a leader-follower topology, the leader pod (e.g., one having a primary database server) can be assigned a higher rank than the follower pod(s) (e.g., ones having secondary database servers) such that the node having that leader pod is upgraded last. As a result, the number of leader elections can be reduced and thus the amount of service disruption to services using a leader-follower topology can be minimized. Moreover, by permitting a user associated with a service to control the ranks assigned by a ranking service to pods/applications of that service, the image upgrade controller can upgrade different services while being oblivious to the intricacies of those services—that is, the image upgrade controller does not have to understand how to rank different services, each of which may have a specific way a user seeks to rank the pods of that service. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software executing on that hardware. Within the illustrated embodiment, system 100 includes a target environment 110, an image upgrade controller 150, and a configuration store 160. As further shown, target environment 110 comprises nodes 120A-C that respectively include pods 130A-C (each having a set of applications 135) and are respectively associated with node ranks 140A-C. The illustrated embodiment may be implemented differently. For example, each pod 130 can be associated with a pod rank.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Consequently, nodes 120, image upgrade controller 150, and/or configuration store 160 may execute on and utilize the cloud resources of that cloud infrastructure (e.g., computing resources, storage resources, network resources, etc.) to facilitate their operations. As an example, image upgrade controller 150 might execute in a virtual environment hosted on server-based hardware included within a datacenter. But in some embodiments, system 100 is implemented utilizing a local or private infrastructure as opposed to a public cloud.

Target environment 110, in various embodiments, is a collection of resources available for implementing services (e.g., a database service, a storage service, etc.). The resources may include hardware (e.g., CPUs, GPUs, disks, etc.), software routines (e.g., VMs, firewalls, etc.), or a combination thereof. As mentioned above, system 100 may be implemented using a cloud infrastructure. Consequently, target environment 110 can correspond to at least a portion of the cloud infrastructure provided by a cloud provider (e.g., Amazon Web Services™) and be made available to one or more tenants (e.g., government agencies, companies, individual users, etc.). For cases in which there are multiple tenants using target environment 110, target environment 110 may provide isolation so that the data of one tenant is not exposed (without authorization) to other tenants. In various embodiments, target environment 110 corresponds to the particular resources of a cloud infrastructure that are being used by a certain tenant-target environment 110 may also be implemented using a private infrastructure. As shown, nodes 120A-C execute in target environment 110 and thus utilize its resources to facilitate their operations.

A node 120, in various embodiments, is a VM that has been deployed onto the resources of target environment 110. A node 120 can be deployed using a node image 165. A node image 165, in various embodiments, is a template having a software configuration (which can include an operating system) that can be used to deploy an instance of a VM. Amazon Machine Image (AMI) is one example of a node image 165. AMI can include snapshots (or a template for the root volume of the instance (e.g., an operating system)), launch permissions, and a block device mapping that specifies the volume(s) to attach to that instance when it is launched. In various embodiments, the software (e.g., applications 135) executing on one node 120 can interact with the software executing on another node 120. For example, a process executing on node 120A may communicate with a process that is executing on node 120B to transfer data from a storage of node 120A to a storage of node 120B. Once a node 120 has been deployed, pods 130 having applications 135 (and potentially other software routines) may then be deployed onto that node 120. In some embodiments, however, a node 120 is a physical machine that has been deployed to target environment 110.

A pod 130, in various embodiments, is a group of containerized applications 135, with shared resources, and a specification for executing the containerized applications. For example, a pod 130 may include a container with a database service application 135 and a container with a ranking service application 135. In some embodiments, pods 130 are deployed using a large-scale deployment service, such as Kubernetes. Once a node 120 has been deployed and become an available resource to Kubernetes, Kubernetes may deploy a requested pod 130 on that node 120. Deploying a pod 130 onto a given node 120 may involve Kubernetes communicating with an agent residing on that node 120, where the agent triggers the execution of the containerized applications 135 in that pod 130—Kubernetes might use a control plane that can automatically handle the scheduling of pods 130 on the nodes 120 of a cluster included in target environment 110. In various embodiments, a node 120 can support multiple pods 130, and thus Kubernetes may deploy multiple pods 130 onto the same node 120. While pods 130 are discussed, in some embodiments, applications 135 can be installed on a node 120 and executed without the use of containerization or a deployment service.

A node rank 140, in various embodiments, is a value associated with a node 120 that is used to determine an order in which to update that node 120 relative to one or more other nodes 120. As discussed in greater detail with respect to FIGS. 4A-C, in various embodiments, a node rank 140 is determined based on the pod(s) 130 executing on the corresponding node 120. For example, the node rank 140 for a node 120 may correspond to the highest pod rank of the pods 130 that are executing on that node 120. Multiple nodes 120 may have the same value for their node rank 140 (e.g., nodes 120 executing the same types of pods 130). In some embodiments, a node's node rank 140 is persisted in a configuration file or with other metadata that describes a set of properties of a deployed node 120. In other embodiments, the node's node rank 140 is not persisted, but instead image upgrade controller 150 may access the pod ranks of that node 120 and then derive the node rank 140 from those pod ranks. An example of ranking pods 130 is discussed in greater detail with respect to FIGS. 2A-D.

Image upgrade controller 150, in various embodiments, is software that is executable to manage tasks related to upgrading nodes 120, including upgrading nodes 120 to a new node image 165. Image upgrade controller 150 may be a stateless process that runs separately (e.g., on its own cluster of nodes) and independently of nodes 120. While image upgrade controller 150 is depicted separately from target environment 110, in some embodiments, image upgrade controller 150 executes on resources (e.g., one or more nodes 120) of target environment 110. In order to facilitate its operation, image upgrade controller 150 is connected to configuration store 160 so that it can access and maintain data relevant to upgrading a node 120. In various embodiments, image upgrade controller 150 can detect the presence of a new node image 165 at configuration store 160 and then proceed to upgrade a set of nodes 120 by causing a new set of nodes 120 to be deployed based on the new node image 165 and then moving elements (e.g., a pod 130) from the old set of nodes 120 to the new set of nodes 120. The order in which those nodes 120 are upgraded may depend on their respective node ranks 140. As an example, node rank 140A may be a higher rank than node ranks 140B and 140C and thus node 120A may be upgraded after nodes 120B and 120C. As discussed in greater detail with respect to FIG. 5, the upgrade order may also depend on the service implemented by a node 120 and the cloud zone in which that node 120 resides.

Configuration store 160, in various embodiments, is a storage repository that is used to store, among other things, node images 165 and metadata pertaining to those node images 165, such as image version numbers. Configuration store 160 may be a local repository that resides on the same network as image upgrade controller 150, or it might be a remote repository (e.g., GitHub) that is external to the controller's network. When a new node image 165 is published, node configuration metadata (e.g., a specification that describes parameters for deploying and configuring a node 120, such as which node image 165 should be used) is updated and persisted in configuration store 160. That information is accessible to image upgrade controller 150 and updates to that information may be used to trigger image upgrade controller 150 to update one or more nodes 120.

Figure 2A:
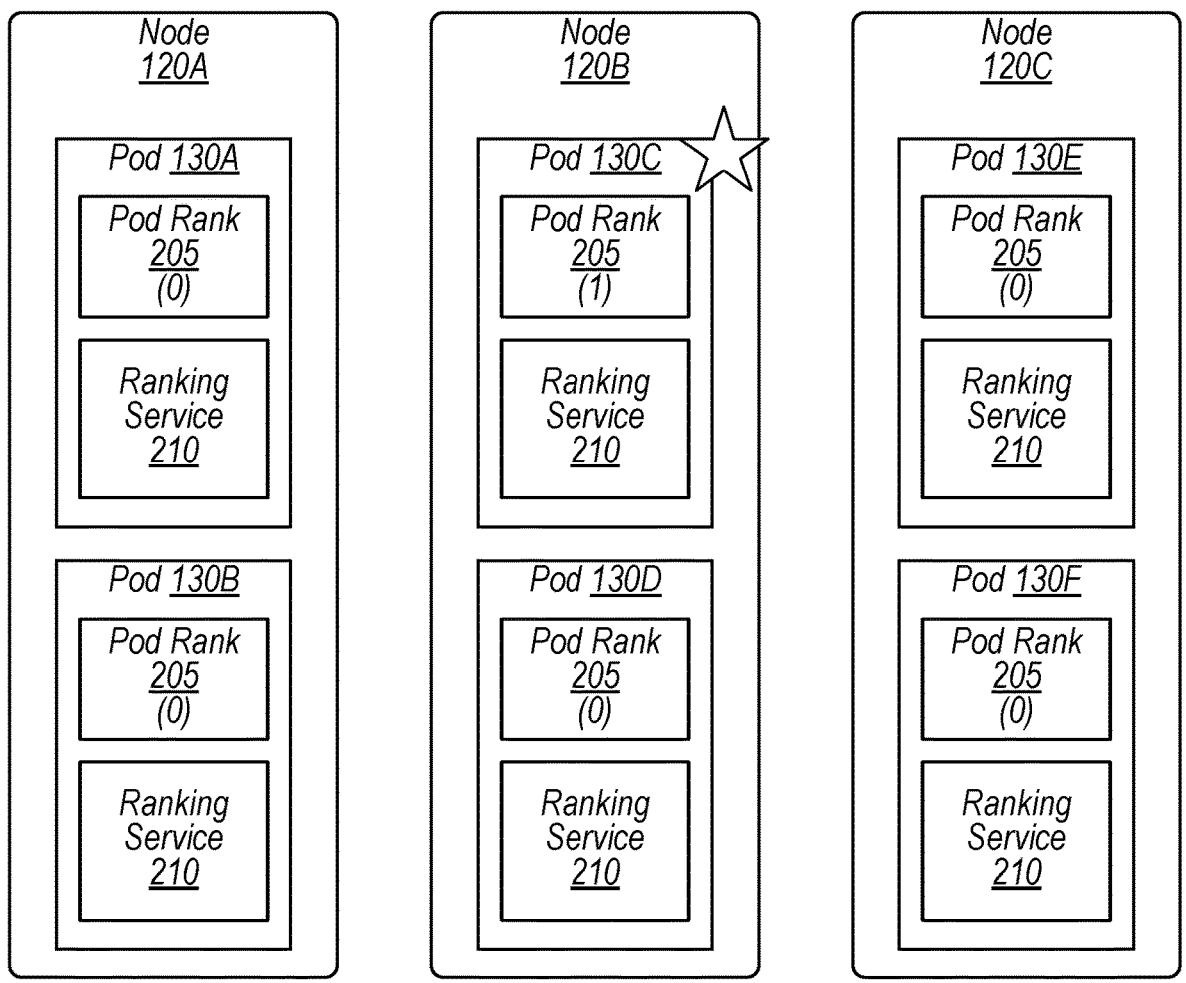
FIGS. 2A-D are block diagrams illustrating example elements of a leader election that affects ranks associated with a set of nodes, according to some embodiments.

Turning now to FIGS. 2A-D, block diagrams of an example leader election that affects pod ranks 205 associated with a set of nodes 120 are shown. In FIG. 2A, there are three nodes 120A-C. As further shown, node 120A includes pods 130A-B, node 120B includes pods 130C-D, and node 120C includes pods 130E-F. Also as shown, pods 130A-F each include a ranking service 210, and pods 130A-B and D-F have a pod rank 205 of "0" while pod 130C has a pod rank 205 of "1". The illustrated embodiment may be implemented differently than shown. For example, a multi-leader topology may be used in which there are multiple leaders and thus one or more of pods 130A-F may have a different pod rank 205.

In various embodiments, multiple pods 130 can collectively implement a service (e.g., a database service) but those pods 130 may fulfill different roles in that service. Different roles may be deemed by a user to have different levels of importance to a service based on how they affect the service when the corresponding nodes 120 are upgraded. As discussed, one example is a leader-follower approach in which the upgrading of a node 120 that includes a leader pod 130 can trigger a leader election that temporarily causes functionality of the service to become unavailable. Consequently, a higher pod rank 205 may be assigned to a leader pod 130 than a follower pod 130—in other cases, a lower pod rank 205 might signify greater importance and thus the leader pod 130 may be assigned a lower pod rank 205 than a follower pod 130. In FIG. 2A, pod 130C corresponds to a leader pod 130 and has been assigned a higher rank by ranking service 210 than the other pods 130 in the illustrated embodiment.

Ranking service 210, in various embodiments, is a set of processes that apply pod ranks 205 to pods 130 based on particular criteria. Ranking service 210 may be implemented in each pod 130 as a sidecar container having an instance of ranking service 210, or it may be executed separately from pods 130 (e.g., a single instance might be executed on a separate node 120 and manage the ranking of multiple pods 130). In various embodiments, the particular criteria used to rank pods 130 of a particular service is configured by a user (e.g., a developer) of that service as the user may be the most familiar with the characteristics of that service. Once the ranking criteria have been defined, ranking service 210 may rank pods 130s based on how they satisfy or do not satisfy the ranking criteria. In various embodiments, ranking service 210 adds a label to a pod 130 (e.g., by updating a configuration file of the pod 130) to indicate its pod rank 205, which is available to image upgrade controller 150.

The rank value assigned to a status (e.g., follower) of a pod 130 may also be configured by a user (e.g., a developer) of a service. In a multi-leader-follower topology for example, the user may assign the status "tier-1 leader" with the value "2," "tier-2 leader" with the value "1," and "follower" with the value "0." Accordingly, ranking service 210 may gather the status of its pods 130 at a regular cadence and then apply the rank value based on the status such that a "tier-1 leader" pod 130 is assigned a pod rank 205 of "2." In various embodiments, ranking service 210 leverages a label that is present on a pod 130 to determine its status. As discussed further below, that label may be controlled by an application executing in a pod 130 associated with the label. While pod ranks 205 are discussed, in various embodiments, non-containerized applications are deployed onto nodes 120, and as a result, application ranks may be applied to the non-containerized applications that are executing on a node 120.

Figure 2B:
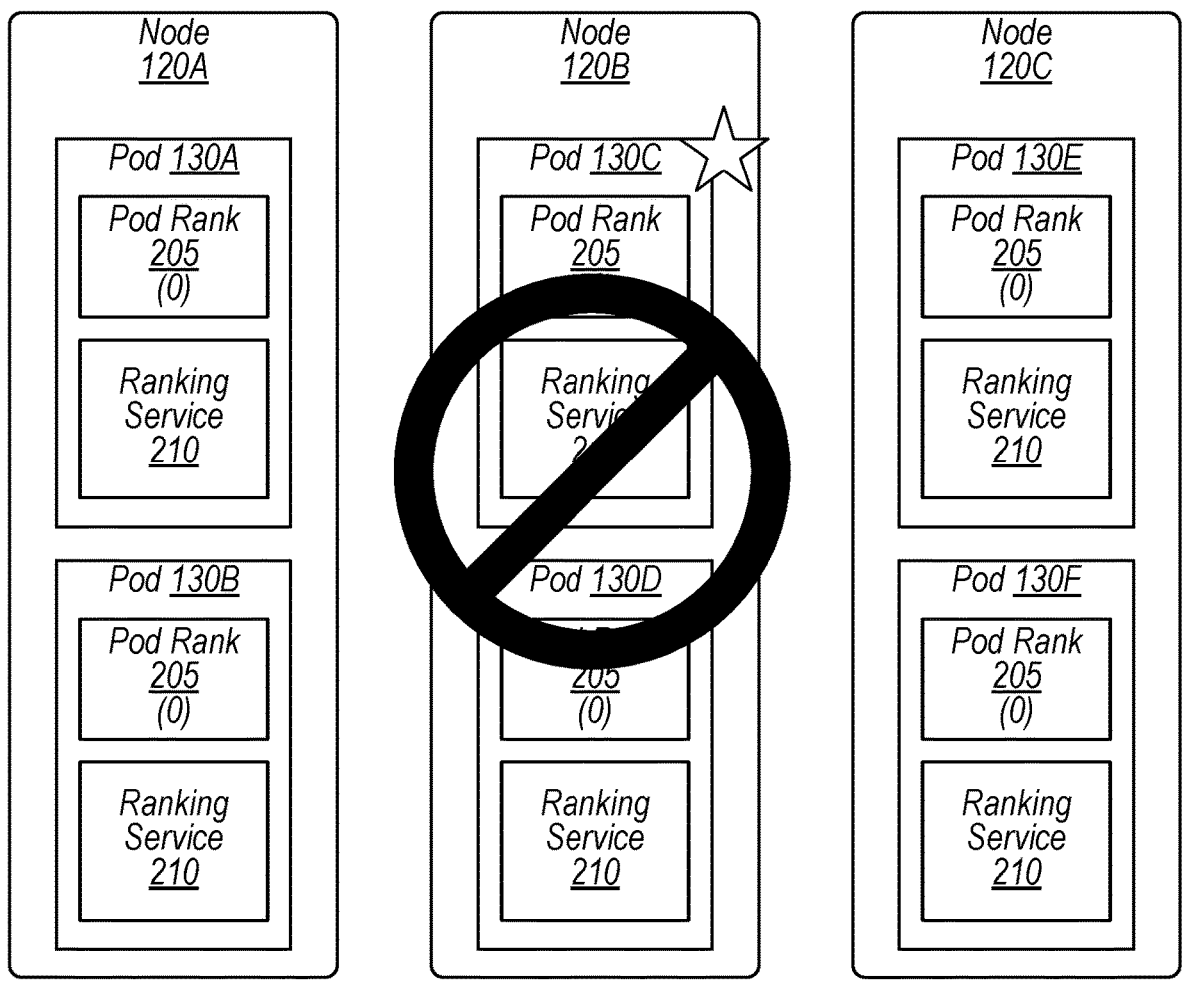

Turning now to FIG. 2B, a block diagram of a continuation of the leader election process discussed with respect to FIG. 2A is shown. The illustrated embodiment includes nodes 120A-C (having pods 130A-B, 130C-D, and 130E-F, respectively), similar to FIG. 2A. Also as shown, pod 130C is designated the leader pod (using a star symbol). During operation of system 100, node 120B may become unavailable. For example, power may be lost to the physical hardware executing node 120B, node 120B might experience a software bug, etc. As a result, the leader instance of the service that is implemented by pods 130A-F becomes unavailable, which causes the service to lose functionality. As an example, the leader instance may be a primary database server and thus lose of that leader instance may result in the database service not being able to write new data to a database. To resolve this issue, a leader election is held to elect a new leader for the service, as shown in FIG. 2C.

Figure 2C:
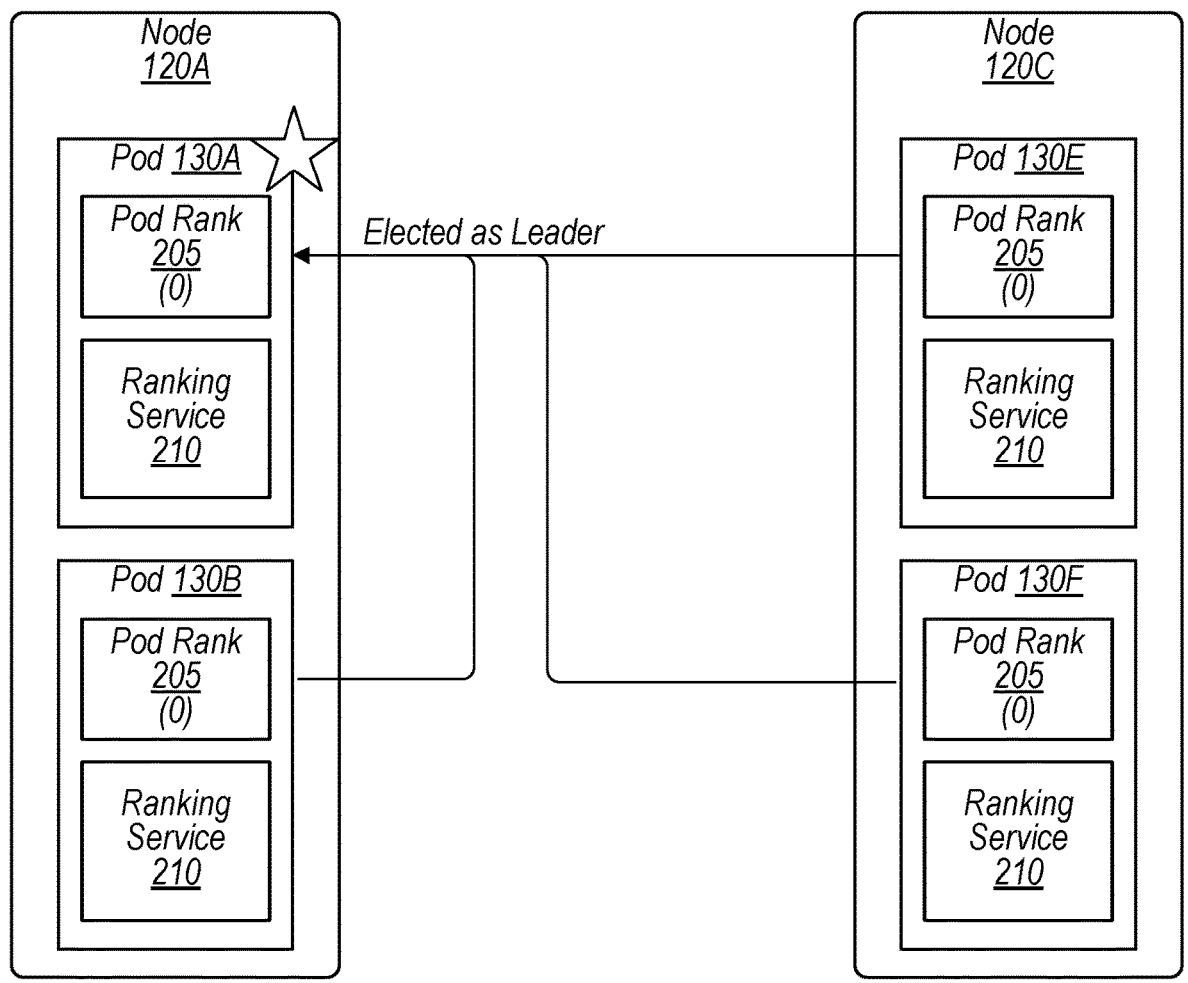

Turning now to FIG. 2C, a block diagram of a continuation of the leader election process discussed with respect to FIG. 2B is shown. The illustrated embodiment includes nodes 120A and 120C (having pods 130A-B and 130E-F, respectively). In a leader-follower topology, pods 130 may include software routines that implement a distributed high-availability service that conducts leader elections in which the pods 130 communicate with each other to elect a leader. A leader may be selected randomly or based on specific criteria (e.g., based on the cloud zone of a pod 130). Once a leader pod 130 has been elected, a label of that pod 130 may be updated to indicate that it is a leader. In the illustrated embodiment, pod 130A is elected to become the new leader of the illustrated pods 130.

Figure 2D:
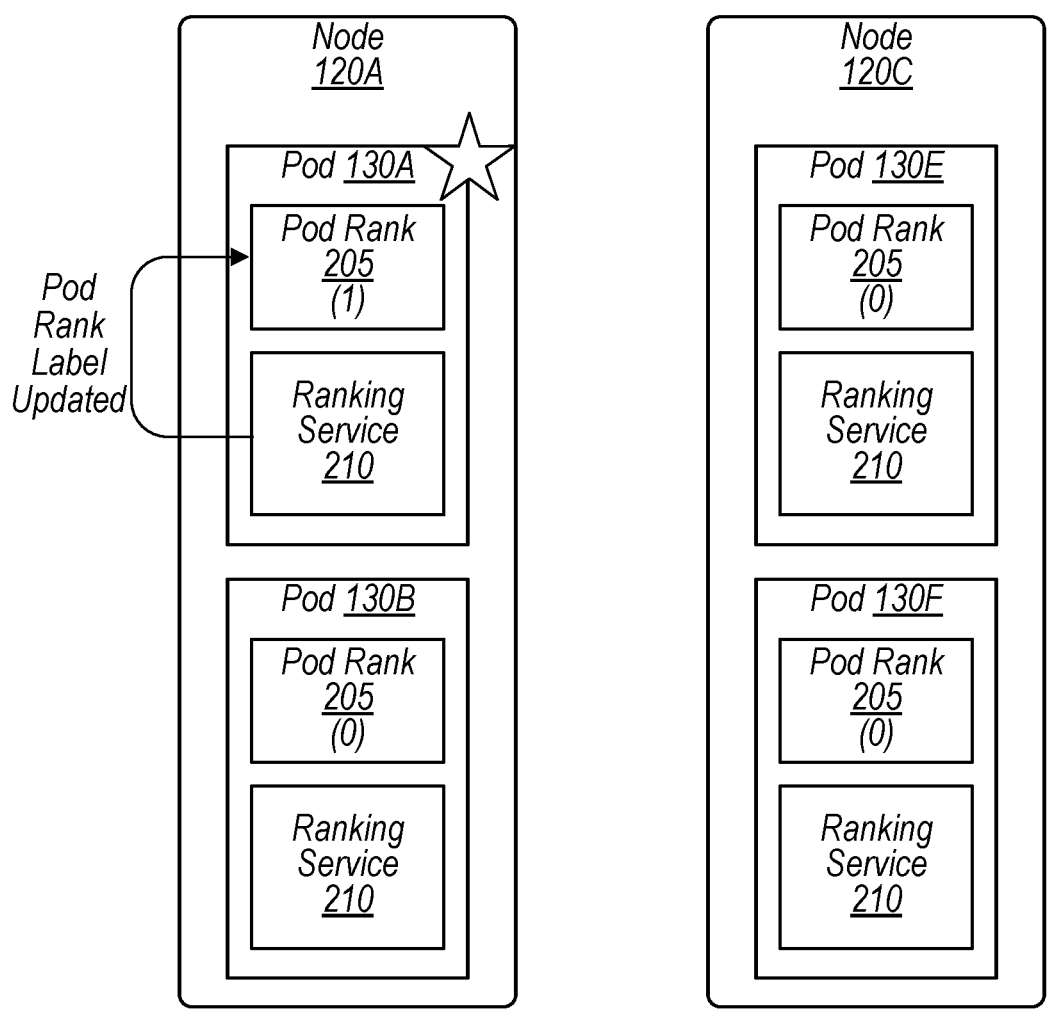

Turning now to FIG. 2D, a block diagram of a continuation of the leader election process discussed with respect to FIG. 2C is shown. The illustrated embodiment includes nodes 120A and 120C (having pods 130A-B and 130E-F, respectively), similar to FIG. 2A. After pod 130A has become the new leader, in various embodiments, ranking service 210 detects that the label of pod 130A has been updated. Ranking service 210 may periodically poll the configuration information of pod 130A and observe that the label has changed. In response to ranking service 210 detecting that pod 130A has become a leader, ranking service 210 updates the pod rank 205 of pod 130A to "1". Accordingly, ranking service 210 may ensure that pod ranks 205 are kept up to date so that nodes 120 are ordered appropriately when image upgrade controller 150 performs a node upgrade process.

While a leader-follower topology is discussed, in various embodiments, a group of pods 130 collectively implement a service but each pod 130 may have a different role. Accordingly, upon being instantiated, an instance of ranking service 210 may observe the type of application 135 executing in its pod 130 and then assign a pod rank 205 based on that type. For example, a service may include a pod 130 having a storage server and another pod 130 having a metrics server that gathers metrics about the storage server. The metrics server may be assigned a lower pod rank 205 than the storage server as the metrics server may play a less important role in the service than the storage server.

Figure 3:
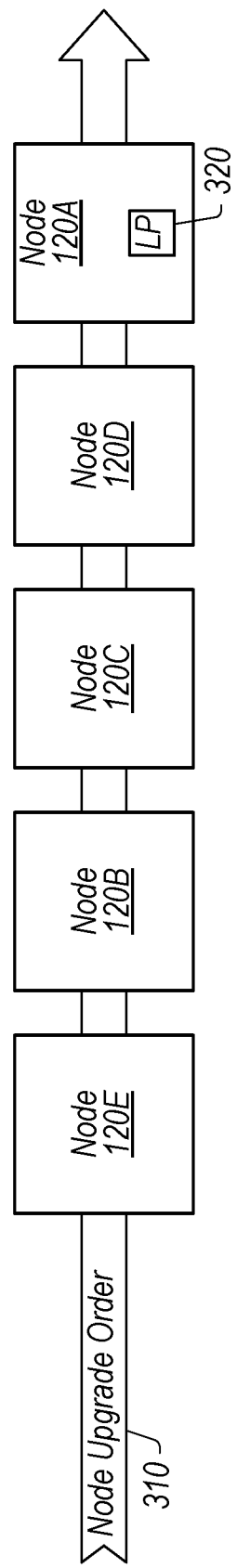
FIG. 3 is a block diagram illustrating example elements of an upgrade order for a set of nodes, according to some embodiments.

Turning now to FIG. 3, a block diagram of an example node upgrade order 310 for a set of nodes 120 is shown. In the illustrated embodiment, there are nodes 120A-E. Also as shown, node 120A includes a leader pod 320, which is the only one in the illustrated embodiment. As explained, when image upgrade controller 150 detects a new node image 165 (for nodes 120A-E), it may perform a node image upgrade process in which a new set of nodes 120 is deployed based on the new node image 165 and then pods 130 that are executing on the old nodes 120 are redeployed onto the new nodes 120. As a part of the node image upgrade process, in various image upgrade controller 150 generates node upgrade order 310 that identifies an ordering in which to upgrade nodes 120. Node upgrade order 310 may be such that more important nodes 120 (from the perspective of a service executing on those nodes 120) are located later in node upgrade order 310 than less important nodes 120. Since node 120A includes a leader pod 320 and the other nodes 120B-E do not include a leader pod 320, node 120A is located after those nodes 120 and thus appears at the end of node upgrade order 310. As a result, node 120A may be upgraded last by image upgrade controller 150. The other nodes 120B-E may be randomly ordered (but before node 120A) or ordered based on the cloud zone in which they are located, as discussed in greater detail with respect to FIG. 5.

In some embodiments, image upgrade controller 150 refreshes node upgrade order 310 after a node 120 is upgraded. In particular, in some cases, the node rank 140 associated with a node 120 may change during the node image upgrade process and thus it may be beneficial to adjust node upgrade order 310 to account for the change to that node rank 140. As an example, during the node image upgrade process, node 120A might crash and thus a leader election may be held to elect a new leader from the other nodes 120 (e.g., nodes 120B-D as image upgrade controller 150 may be upgrading node 120E). If node 120B is elected to be the new leader (that is, one of its pods 130 has been elected to serve as the leader of a service), then after upgrading node 120E, image upgrade controller 150 may reorder node upgrade order 310 such that node 120B is upgraded after nodes 120C and 120D so that additional leader elections can be avoided that would result from the previous node upgrade order 310.

Figure 4A:
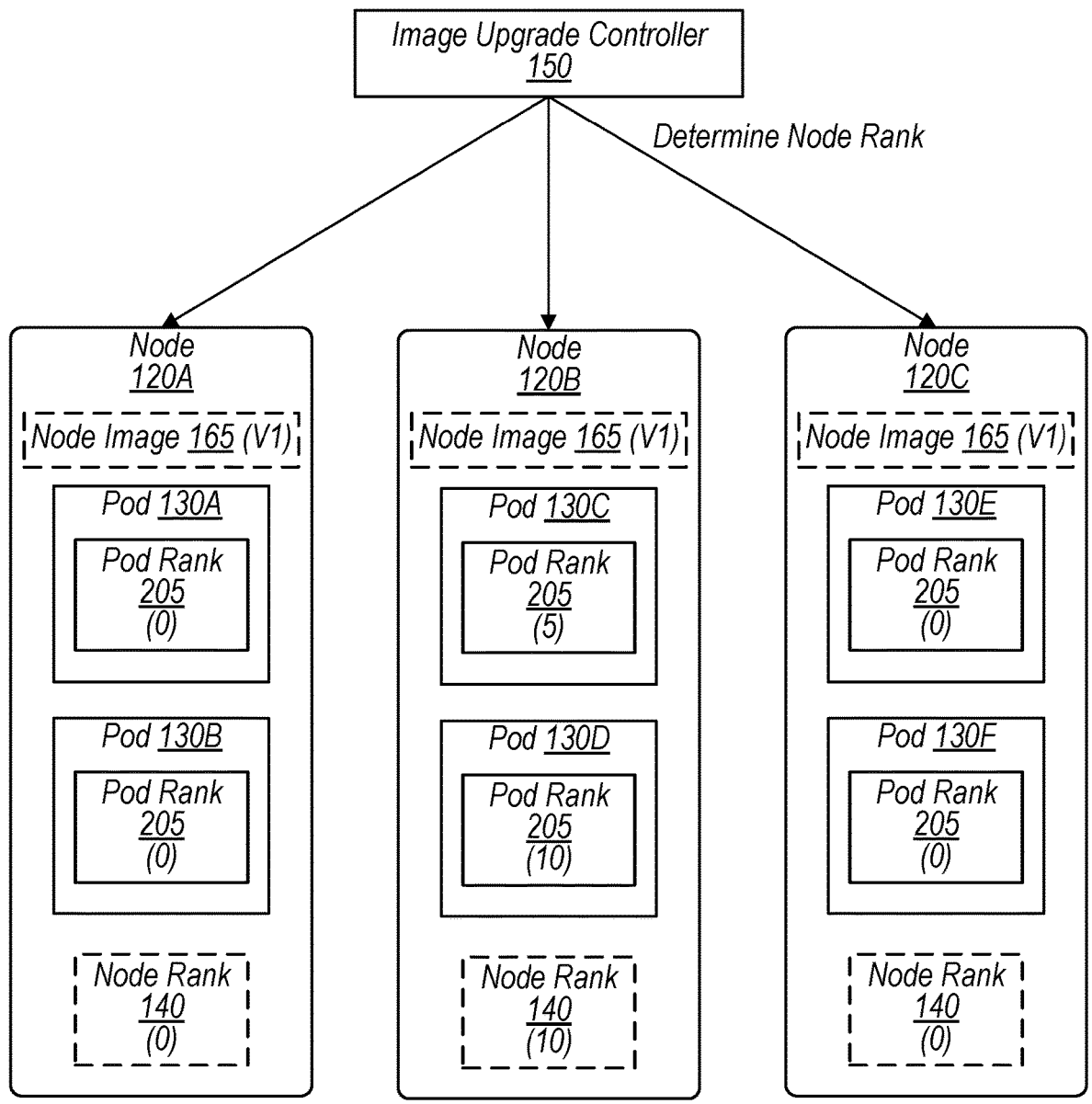
FIG. 4A-C are block diagrams illustrating example elements of a node upgrade process for a node, according to some embodiments.
Figure 4B:
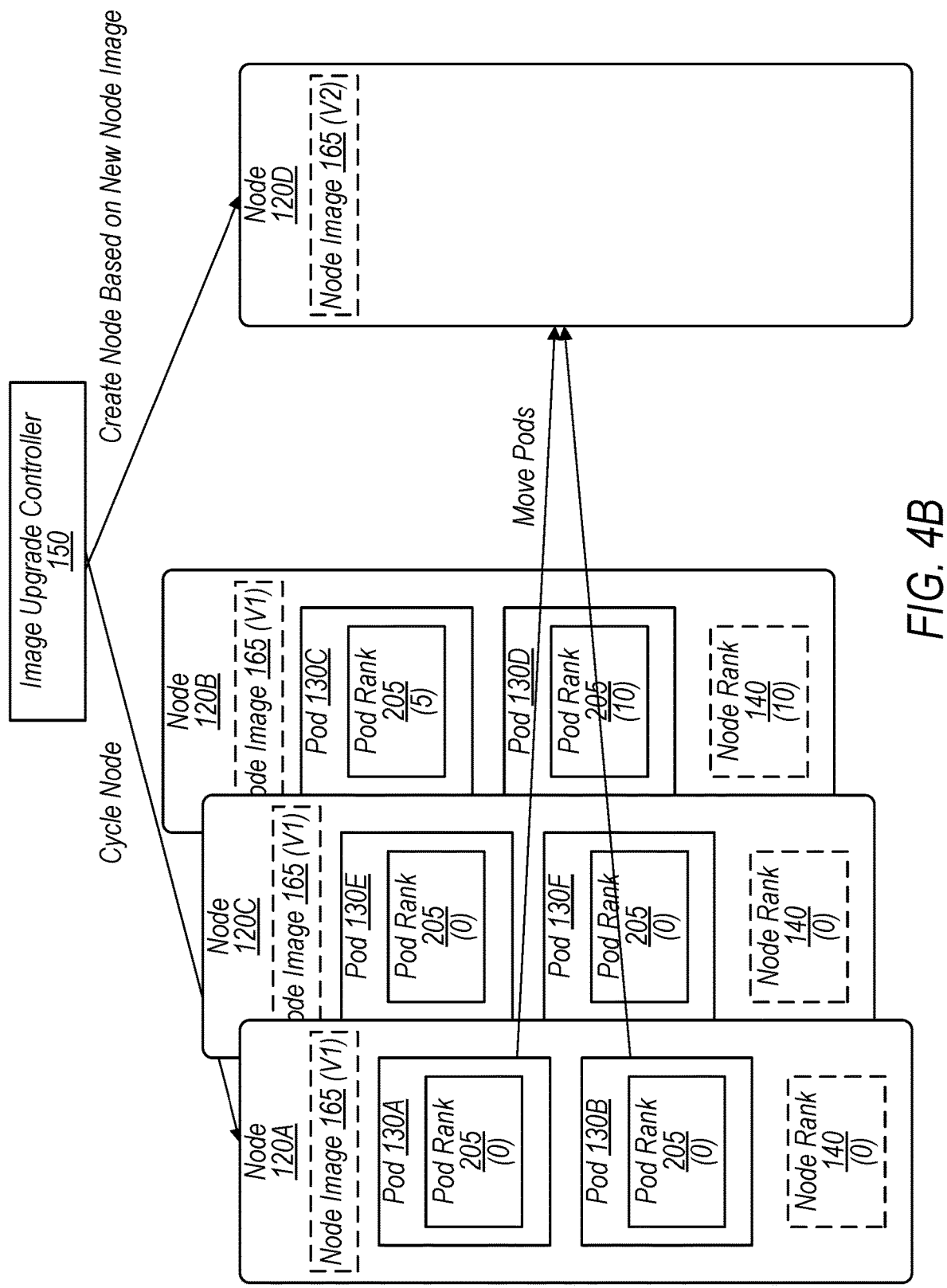
Figure 4C:
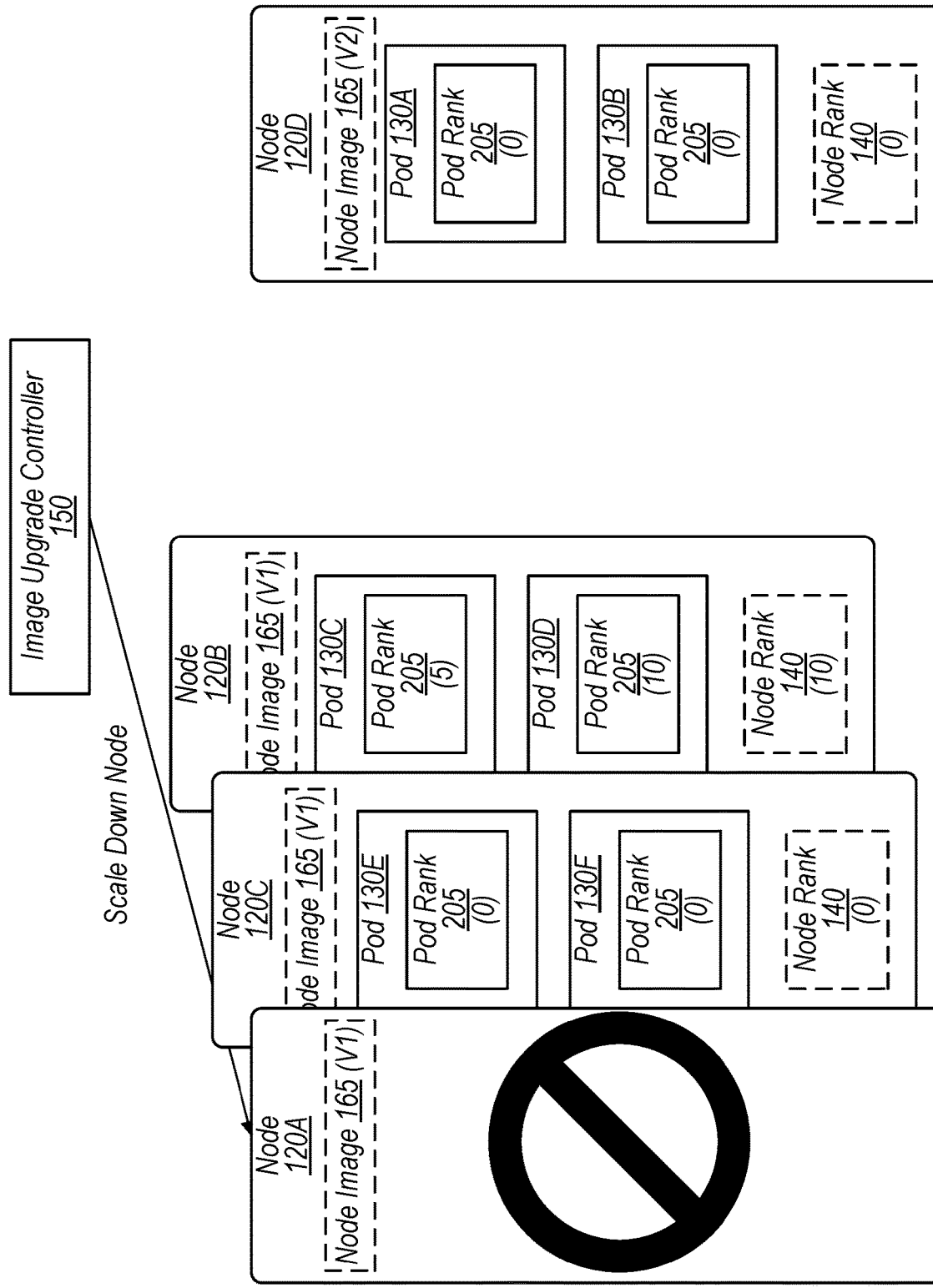

Turning now to FIGS. 4A-C, block diagrams of an example node upgrade process for a node 120 are shown. In FIG. 4A, there are three nodes 120A-C. As further shown, node 120A includes pods 130A-B, node 120B includes pods 130C-D, and node 120C includes pods 130E-F. Also as shown, pods 130A-B and E-F have a pod rank 205 of "0" while pod 130C has a pod rank 205 of "5" and pod 130D has a pod rank 205 of "10". The illustrated embodiment may be implemented differently than shown. For example, there may at least two non-zero pod ranks 205 across at least two different nodes 120.

Image upgrade controller 150 may initially be idle while it waits for a new node image 165 to be published to configuration store 160. Over time, new versions of a node image 165 may be developed and published to configuration store 160 (e.g., by uploading the new node image 165 or storing a link to the new node image 165). In some embodiments, upon a new node image 165 being published, image upgrade controller 150 may receive an indication from configuration store 160 or a user about the new node image 165. In other embodiments, image upgrade controller 150 may poll configuration store 160 periodically and detect that the node image version of the node image 165 that is stored at configuration store 160 is different than the node image version of nodes 120A-C.

In response to detecting a new node image 165, image upgrade controller 150 may then generate a node upgrade order 310 for nodes 120A-C. As such, in various embodiments, image upgrade controller 150 determines node ranks 140 for nodes 120A-C. In some cases, their node ranks 140 have already been derived and stored and thus image upgrade controller 150 accesses those node ranks 140 from configuration metadata about nodes 120A-C. In other cases, image upgrade controller 150 accesses the pod rank 205 of each pod 130 that is executing on nodes 120A-C. Image upgrade controller 150 may access those pod ranks 205 from ranking service 210 or from configuration metadata about nodes 120A-C. Image upgrade controller 150 may then calculate the node rank 140 of a given node 120 (e.g., node 120A) by determining the highest pod rank 205 associated with that node 120. As depicted for example, the highest pod rank 205 of node 120B is "10," and as a result, the node rank 140 of node 120B is "10." In some embodiments, image upgrade controller 150 stores the node rank 140 of each node 120 in configuration metadata associated with that node 120—ranking service 210 may update that node rank 140 in response to a change to a pod rank 205 associated with that node 120 and thus node ranks 140 may be kept up to date. After the node ranks 140 for nodes 120A-C have been determined, in various embodiments, image upgrade controller 150 generates the node upgrade order 310 for nodes 120A-C such that the higher ranked nodes 120 are upgraded after lower ranked nodes 120. Thus, for the illustrated embodiment, node 120B appears after nodes 120A and 120C in their node upgrade order 310.

Turning now to FIG. 4B, a block diagram of a continuation of the node upgrade process discussed with respect to FIG. 4A is shown. The illustrated embodiment includes nodes 120A-C (having pods 130A-B, 130C-D, and 130E-F, respectively), similar to FIG. 4A. As depicted, nodes 120A-C are ordered according to their node upgrade order 310. After generating that upgrade order 310, image upgrade controller 150 may then begin updating nodes 120A-C. To upgrade node 120A, in various embodiments, image upgrade controller 150 causes a new node 120D to be provision based on a node image 165 (V2). To provision node 120D, in various embodiments, image upgrade controller 150 interfaces with a deployment system (e.g., Kubernetes) to deploy node 120D (e.g., by providing the new node image 165 (V2) to that system and then instructing it to deploy the new node 120). In some embodiments, image upgrade controller 150 deploys node 120D without the assistance of the deployment system as it may control the allocation of resources to target environment 110. After provisioning node 120D, image upgrade controller 150 may redeploy pods 130A-B onto node 120D, as shown.

Turning now to FIG. 4C, a block diagram of a continuation of the node upgrade process discussed with respect to FIG. 4B is shown. In the illustrated embodiment, there is nodes 120A-D and image upgrade controller 150. After image upgrade controller 150 has provisioned node 120D and redeployed pods 130A-B from node 120A onto node 120B, in various embodiments, image upgrade controller 150 removes node 120A from target environment 110—its resources may be reclaimed and then used for another purpose. After upgrading node 120A by allocating a new node 120 based on the new node image 165 and scaling down node 120A, image upgrade controller 150 may then proceed to upgrade node 120C as it is the next node 120 in the upgrade order 310 that was generated by image upgrade controller 150. As mentioned, in some cases, image upgrade controller 150 may regenerate the upgrade order 310 to ensure that any changes to the ranks associated with the remaining nodes 120 are reflected in the upgrade order 310.

Figure 5:
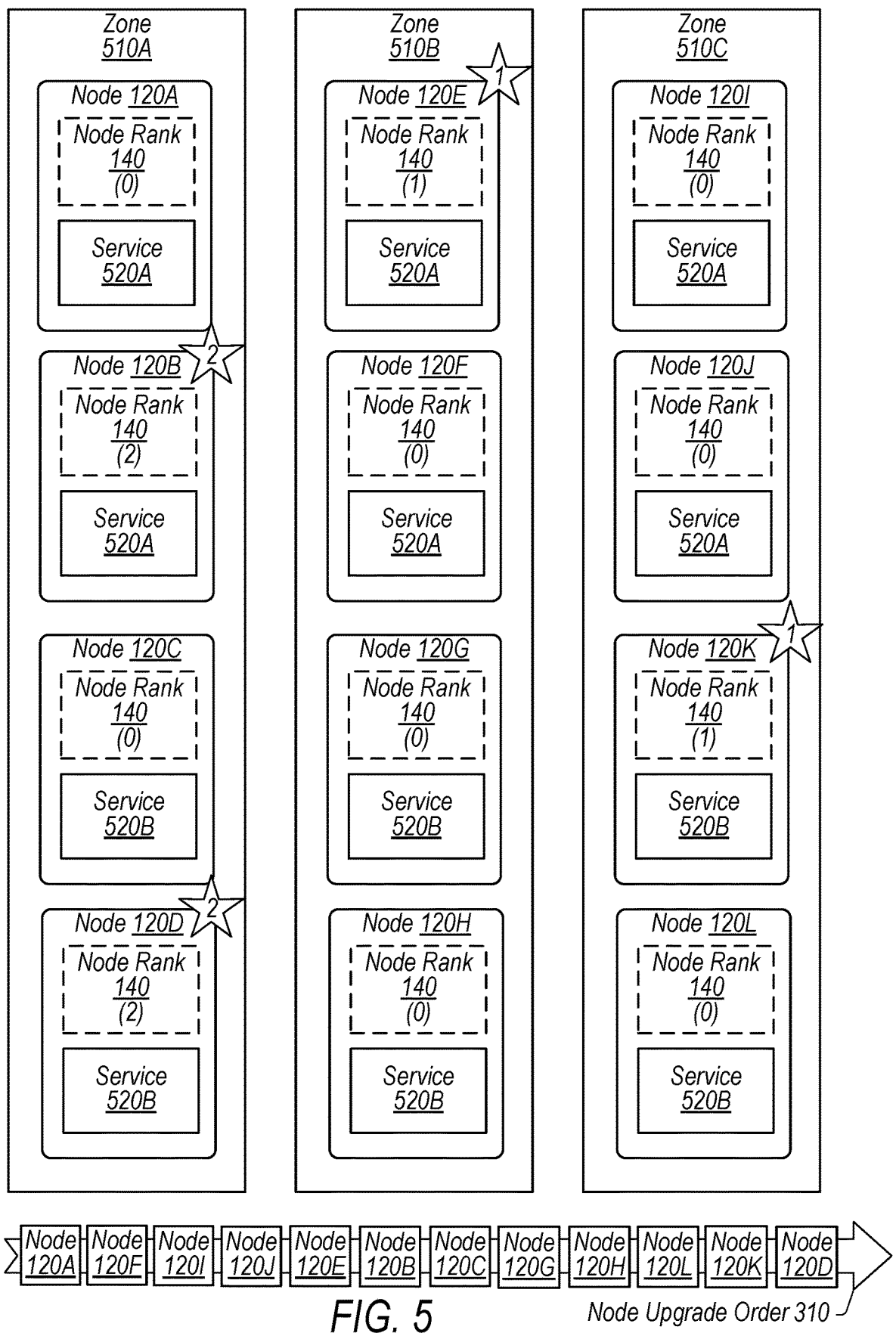
FIG. 5 is a block diagram illustrating example elements of an upgrade order for a set of nodes in different cloud zones, according to some embodiments.

Turning now to FIG. 5, a block diagram of an example node upgrade order 310 for a set of nodes 120 in different zones is shown. In the illustrated embodiment, there are three zones 510A-C that include nodes 120A-D, 120E-H, and 120I-L, respectively. Also as shown, nodes 120A-B, 120E-F, and 120I-J provide a service 520A and nodes 120C-D, 120G-H, and 120K-L provide a service 520B. As further shown, nodes 120B and 120D are associated with a node rank 140 of "2," nodes 120E and 120K are associated with a node rank 140 of "1," and the remaining nodes 120 are associated with a node rank 140 of "0." The illustrated embodiment may be implemented differently than shown. For example, there may be multiple leader nodes 120 of a service 520 that share the same node rank 140 (e.g., nodes 120B and 120E could both have a node rank 140 of "1").

Zones 510, in various embodiments, are isolated locations in a data center region from which public cloud services can originate and operate. The resources within a zone 510 can be physically and logically separated from the resources of another zone 510 such that failures in one zone, such as a power outage, do not affect the resources and operations occurring within the other zone in most cases. Accordingly, in order for a service 520 to provide high availability to users, in various embodiments, that service 520 is distributed across multiple zones 510. A service 520, in various embodiments, is a set of functionality provided to users by one or more software applications that collectively implement the set of functionality. For example, service 520A might be a database service that writes data to a database while service 520B might be a storage service that stores that data. In order for, e. g., service 520B to provide high availability, at least one instance of the storage application(s) that implement service 520B may be deployed per zone 510. In some embodiments, an instance of a service 520 is encapsulated in a pod 130 (which includes the applications 135 of one instance of that service 520) and thus distributing that service 520 across multiple zones 510 includes deploying multiple pods 130 across those zones 510 (one per zone). As a result, that service 520 can continue to be service requests even if the systems of one of the zones 510 become unavailable (e.g., due to a network failure). In some embodiments, a region of a cloud (e.g., northeast region of the US) includes more than one zone 510. For example, zones 510A-B may each correspond to a respective data center in the same region of a cloud.

In various embodiments, image upgrade controller 150 takes into account a node's zone 510 and service(s) 520 when generating a node upgrade order 310. This may be done to ensure that a node upgrade order 310 causes the smallest possible impact to the services 520 affected by that node upgrade order 310. In some embodiments, nodes 120 are primarily grouped by service 520, then by node rank 140, and lastly by zone 510. Using the illustrated node upgrade order 310 as an example. As depicted, nodes 120A-B, 120E-F, and 120I-J that provide service 520A are included as a group at the front half of node upgrade order 310 while nodes 120C-D, 120G-H, and 120K-L that provide service 520B are included as a group at the back half of node upgrade order 310. Continuing the example, each group is further ordered according to node rank 140, and thus nodes 120E and 120B appear at the back of the first group and nodes 120K and 120D appear at the back of the second group. Nodes 120 of the same node rank 140 are then ordered according to zone 510 and thus node 120A of zone 510A appears first in the first group followed by node 120F of zone 510B and then by nodes 120I-J of zone 510C. Other sorting algorithms may be applied. For example, nodes 120 may be ordered by node rank 140 and zone 510 but not by service 520, or ordered by node rank 140 and service 520 but not by zone 510.

Figure 6:
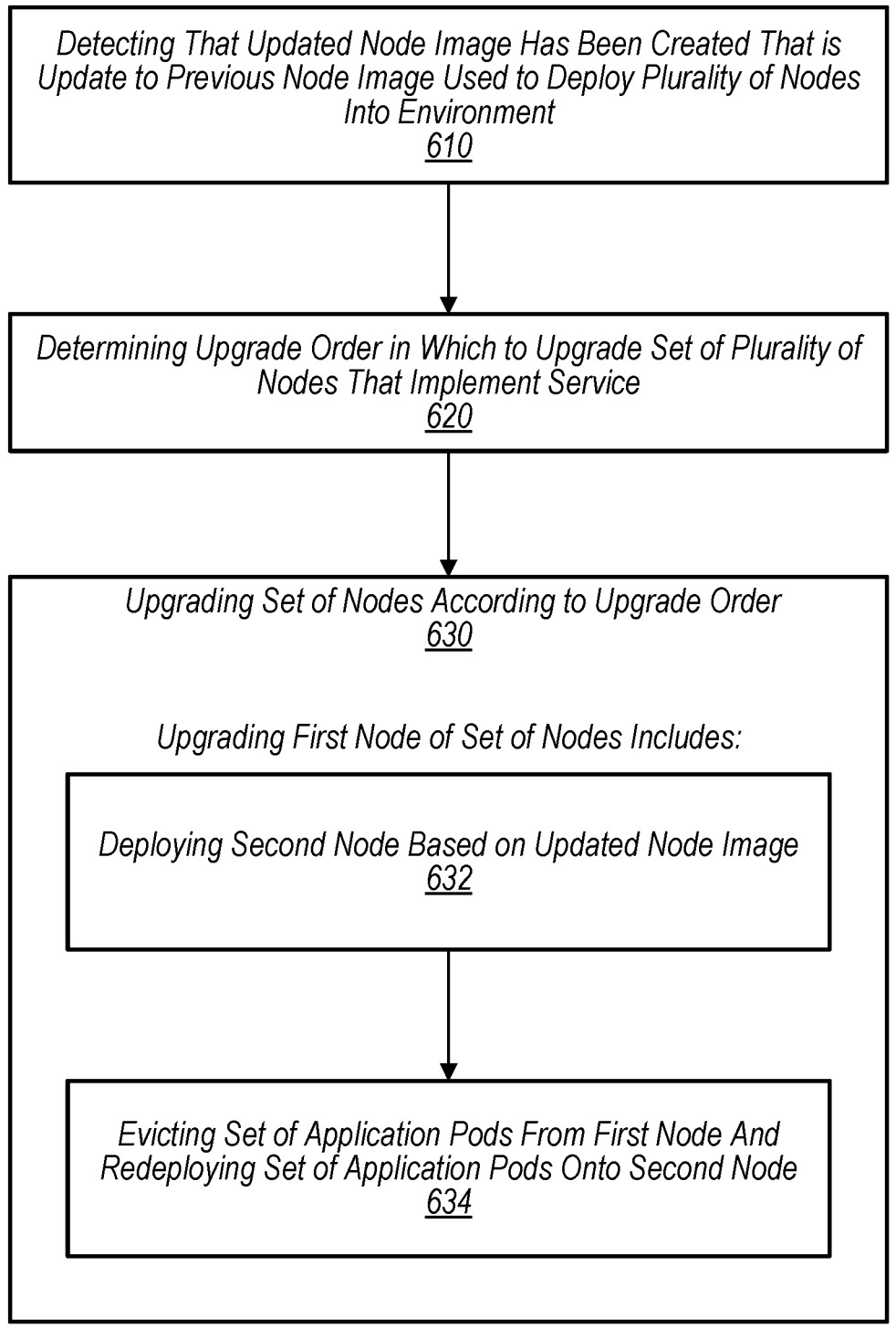
FIG. 6 is a flow diagram illustrating example method relating to a node upgrade process for a set of nodes, according to some embodiments.

Turning now to FIG. 6, a flow diagram of a method 600 is shown. Method 600 is one embodiment of a method performed by an upgrade controller (e.g., image upgrade controller 150) executing on a computer system to upgrade a set of nodes (e.g., nodes 120) to a new node image (e.g., a node image 165). Method 600 may be performed by executing a set of program instructions stored on a non-transitory computer-readable medium of the computer system. In some embodiments, method 600 includes more or less steps than shown. For example, method 600 may include a step in which the upgrade controller interacts with a deployment system to deploy nodes.

Method 600 begins in step 610 with the upgrade controller detecting that an updated node image has been created that is an update to a previous node image that was used to deploy a plurality of nodes into an environment (e.g., target environment 110) that is associated with the upgrade controller. In some embodiments, the detecting is based on the upgrade controller polling a node configuration store (e.g., configuration store 160) for information pertaining to the nodes and determining that a current node image stored at the node configuration store is different than the previous node image.

In step 620, the upgrade controller determines an upgrade order (e.g., an upgrade order 310) in which to upgrade a set of the plurality of nodes that implement a service (e.g., a storage service). In various embodiments, the upgrade order is determined based on a rank (e.g., a node rank 140) associated with a given node of the set of nodes by a ranking service (e.g., ranking service 210) that is decoupled from the upgrade controller—that is, the upgrade controller and the ranking service are separate and distinct entities from each other. A given one of a set of applications pods (e.g., pods 130) executing on a first node of the set of nodes may be assigned a rank (e.g., a pod rank 205) by the ranking service and the rank associated with the first node may correspond to the highest rank of those application pods. Determining the upgrade order may include the upgrade controller accessing the set of ranks of the set of application pods and deriving the rank associated with the first node from the set of ranks. In various embodiments, the upgrade order is further determined based on which cloud zone of a plurality of cloud zones of the environment includes the first node. The set of nodes may implement a leader-follower topology in which the rank associated with a given node is determined based on whether that given node is a leader node.

In step 630, the upgrade controller upgrades the set of nodes according to the upgrade order. In some cases, the set of nodes include one leader node that is updated last for the set of nodes. The set of nodes may include at least two leader nodes that are associated with different ranks. In step 632, as part of upgrading the first node of the set of nodes, the upgrade controller deploys a second node based on the updated node image. In step 634, the upgrade controller evicts the set of application pods from the first node and redeploys the set of application pods onto the second node. At least two of the set of application pods may each execute an instance of the ranking service. In some embodiments, after upgrading the first node of the set of nodes, the upgrading controller reevaluates the upgrade order based on remaining nodes of the set of nodes that have not been upgraded.

Exemplary Computer System

Figure 7:
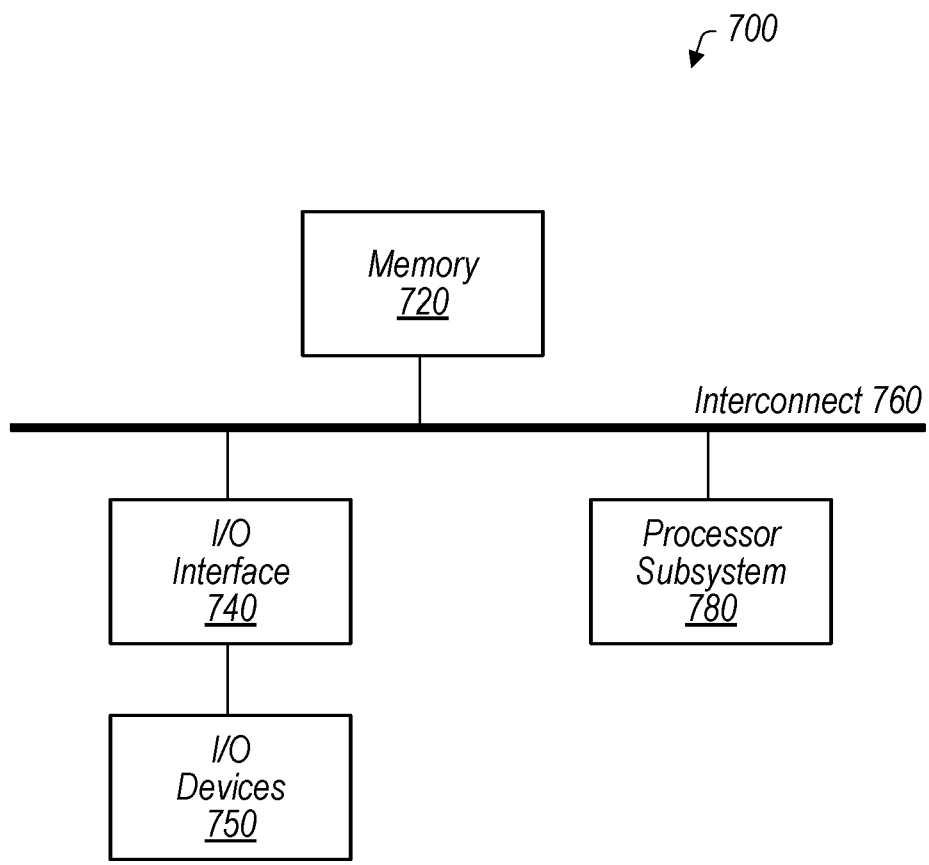
FIG. 7 is a block diagram illustrating elements of a computer system for implementing various systems described in the present disclosure, according to some embodiments.

Turning now to FIG. 7, a block diagram of an exemplary computer system 700, which may implement system 100, target environment 110, a node 120, image upgrade controller 150, and/or configuration store 160 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement an application 135, a pod 130, and/or image upgrade controller 150 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method of updating a plurality of virtual machines (VMs) that implements a service, the method comprising:
    detecting, by an upgrade controller executing on a computer system, that an updated image has been created that is an update to a previous image used to deploy the plurality of VMs into an environment associated with the upgrade controller;
    determining, by the upgrade controller, a controlled upgrade order in which to upgrade the plurality of VMs, wherein the determining includes:
        accessing, for a first one of the plurality of VMs, a plurality of ranks assigned to a plurality of application pods executing on the first VM, wherein each of the plurality of application pods includes a respective instance of a ranking service that assigns a rank to that application pod;
        determining a node rank for the first VM based on the plurality of ranks, wherein the controlled upgrade order is determined based on the node rank; and
    upgrading, by the upgrade controller, the plurality of VMs according to the controlled upgrade order, wherein upgrading the first VM includes:
        deploying a second VM based on the updated image; and
        evicting the plurality of application pods from the first VM and redeploying the plurality of application pods onto the second VM.

2. The method of claim 1, wherein the plurality of VMs implements a leader-follower topology in which the node rank associated with the first VM is based on whether the first VM is a leader VM.

3. The method of claim 2, wherein the plurality of VMs includes one leader VM that is updated last for the plurality of VMs.

4. The method of claim 2, wherein the plurality of VMs includes at least two leader VMs that are associated with different node ranks.

5. The method of claim 2, wherein the controlled upgrade order is further determined based on which cloud zone of a plurality of cloud zones of the environment includes the first VM.

6. The method of claim 1, wherein the node rank of the first VM corresponds to the highest rank of the plurality of application pods.

7. The method of claim 1, further comprising:
    after upgrading the first VM, the upgrading controller reevaluating the controlled upgrade order based on remaining VMs of the plurality of VMs that have not been upgraded.

8. The method of claim 1, wherein the detecting is based on the upgrade controller polling a node configuration store for information pertaining to the plurality of VMs, and wherein the node configuration store stores the updated image.

9. A non-transitory computer readable medium having program instructions stored thereon that are executable by a computer system to cause the computer system to implement an upgrade controller that is operable to perform operations comprising:
    detecting that an updated image has been created that is an update to a previous image used to deploy a plurality of VMs into an environment associated with the upgrade controller;
    determining a controlled upgrade order in which to upgrade the plurality of VMs, wherein the determining includes:
        accessing, for a first one of the plurality of VMs, a plurality of ranks assigned to a plurality of application pods executing on the first VM, wherein each of the plurality of application pods includes a respective instance of a ranking service that assigns a rank to that application pod;
        determining a node rank for the first VM based on the plurality of ranks, wherein the controlled upgrade order is determined based on the node rank; and
    upgrading the plurality of VMs according to the controlled upgrade order, wherein upgrading the first VM includes:
        deploying a second VM based on the updated image; and
        evicting the plurality of application pods from the first VM and redeploying the plurality of application pods onto the second VM.

10. The non-transitory computer readable medium of claim 9, wherein the plurality of VMs implements a leader-follower topology in which at least one of the plurality of VMs is a leader VM and other ones of the plurality of VMs are follower VMs, wherein the controlled upgrade order is such that the follower VMs are upgraded before the at least one leader VM.

11. The non-transitory computer readable medium of claim 9, wherein the node rank of the first VM corresponds to the highest rank of the plurality of ranks.

12. The non-transitory computer readable medium of claim 9, wherein the controlled upgrade order is determined based on which one of a plurality of service is implemented by the first VM.

13. The non-transitory computer readable medium of claim 9, wherein the detecting includes:
   polling a node configuration store for node image information that identifies a current image to be used to deploy VMs to the environment; and
   receiving, from the node configuration store, node image information that identifies the updated image.

14. A system, comprising:
   at least one processor; and
   memory having program instructions stored thereon that are executable by the at least one processor to cause the system to implement an upgrade controller that is operable to perform operations comprising:
      detecting that an updated image has been created that is an update to a previous image used to deploy a plurality of VMs into an environment associated with the upgrade controller;
      determining a controlled upgrade order in which to upgrade the plurality of VMS, wherein the determining includes:
         accessing, for a first one of the plurality of VMs, a plurality of ranks assigned to a plurality of application pods executing on the first VM, wherein each of the plurality of application pods includes a respective instance of a ranking service that assigns a rank to that application pod;
         determining a node rank for the first VM based on the plurality of ranks, wherein the controlled upgrade order is determined based on the node rank; and
      upgrading the plurality of VMs according to the controlled upgrade order, wherein upgrading the first VM of the plurality of VMs includes:
         deploying a second VM based on the updated image; and
         evicting a plurality of applications from the first VM and redeploying the plurality of applications on the second VM.

15. The system of claim 14, wherein the plurality of VMs includes a leader VM that is operable to service requests to write records to a database and a set of follower VMs operable to service requests to read records from the database, and wherein the controlled upgrade order is such that the set of follower VMs is upgraded before the leader VM.

16. The system of claim 14, wherein the controlled upgrade order is determined based on which cloud zone of a plurality of cloud zones of the environment includes the first VM, and wherein the controlled upgrade order is further determined based on which one of a plurality of service is implemented by the first VM.

17. The system of claim 14, wherein the operations further comprise:
   after upgrading the first VM, reevaluating the controlled upgrade order based on remaining VMs of the plurality of VMs that have not been upgraded.

18. The system of claim 14, wherein the detecting includes:
   determining that a current image stored at a node configuration store is different than the previous image, wherein the current image corresponds to the updated image.

* * * * *

UNITED STATES PATENT AND TRADEMARK OFFICE
CERTIFICATE OF CORRECTION

PATENT NO. : 12,487,810 B2
APPLICATION NO. : 18/055624
DATED : December 2, 2025
INVENTOR(S) : Shrikant Thakare et al.

Page 1 of 1

It is certified that error appears in the above-identified patent and that said Letters Patent is hereby corrected as shown below:

In the Claims

In Column 17 (Claim 14), Line 20, please delete "VMS" and insert -- VMs --.

In Column 17 (Claim 14), Lines 26-27, please delete "as signs" and insert -- assigns --.

Signed and Sealed this
Twentieth Day of January, 2026

John A. Squires
*Director of the United States Patent and Trademark Office*